United States Patent [19]

Doremus et al.

[11] 4,388,413
[45] Jun. 14, 1983

[54] SILVER HALIDE GLASSES

[76] Inventors: Robert H. Doremus, 1544 Keyes Ave., Schenectady, N.Y. 12309; George Csanak, 167 Cold Spring Rd., Stamford, Conn. 06905; B. Michael Kale, 70 Olmstead La.; James E. Moore, 105 Keeler Dr., both of Ridgefield, Conn. 06877

[21] Appl. No.: 313,481

[22] Filed: Oct. 21, 1981

[51] Int. Cl.³ .......................... C03C 3/12; C03C 3/18; C03C 3/24
[52] U.S. Cl. .......................... 501/40; 501/37; 501/904
[58] Field of Search .......................... 501/37, 40, 904; 65/134

[56] References Cited

U.S. PATENT DOCUMENTS

| | | | |
|---|---|---|---|
| 2,466,506 | 4/1948 | Sun et al. | 501/40 |
| 2,466,507 | 4/1948 | Sun | 501/40 |
| 2,466,509 | 4/1948 | Sun | 501/40 |
| 2,511,224 | 6/1950 | Sun et al. | 501/40 |
| 2,819,977 | 1/1958 | De Paolis | 501/40 |
| 3,502,386 | 3/1970 | Letter | 501/40 |
| 3,930,873 | 1/1976 | Kaes et al. | 501/40 |
| 3,950,591 | 4/1976 | Gliemeroth et al. | 501/13 |
| 4,141,741 | 2/1979 | Lucas et al. | 501/40 |

*Primary Examiner*—Mark Bell
*Attorney, Agent, or Firm*—Brumbaugh, Graves, Donohue & Raymond

[57] ABSTRACT

A silver halide glass is formed from silver iodide, silver fluoride and aluminum fluoride.

4 Claims, 2 Drawing Figures

SILVER HALIDE GLASSES

BACKGROUND OF THE INVENTION

This invention relates to the formation of novel glass compositions, and particularly to the formation of glass compositions wherein the principal components comprise silver halides.

Glass is an ideal optical material because it can be easily formed into different shapes such as lenses, prisms and fibers. Silicate glasses in practical dimensions have an absorption edge at about three to four $\mu m$ in the infrared spectral range and other oxides also absorb in the middle infrared, so glasses of other compositions, such as halides, have been sought for use in the middle infrared.

The middle infrared has several advantages for a variety of optical applications: longer waveguide cores can be fabricated, high power laser energy can be transmitted, and heat detection and measurement can be made. Various crystalline materials have been suggested for infrared optical fibers, B. Bendow and S. S. Mitra, "Fiber Optics: Recent Advances in Research and Development", Plenum, N.Y., 1979, pp. 105–118; 119–122; T. J. Bridges, J. S. Hasiak, and A. R. Strand, Opt. Lett. 5, 85–86 (1980); D. A. Pinnow, A. L. Gentile, A. G. Standlee, A. J. Timper, and L. M. Hobrock, Appl. Phys. Lett. 33, 28–29 (1981), but these fibers are difficult to fabricate and are fragile. Some glasses such as $ZnCl_2$ are being developed for use in the 2–5 $\mu m$ region, L. G. Van Uitert and S. H. Wemple, Appl. Phys. Lett. 33, 57 (1978), and a new class of fluoride glasses, A. Lecoq and M. Poulain, J. Noncryst. Solids 34, 101 (1979), M. G. Drexhage, C. T. Moynihan, and M. Saleh, Mat. Res. Bull. 15, 213–219 (1980), based on $ZrF_4$ and $HfF_4$ are useful up to about 8 $\mu m$.

In an article entitled "Glass Forming Substances", K. J. Sun proposed the formation of pure silver halide glasses and glasses comprising mixed silver halides. Proposed examples include pure silver chloride or a mixture of silver chloride and silver fluoride. Attempts to form silver halide glasses according to Sun's proposals have been unsuccessful due to crystal formation.

Silver halides generally have good infrared radiation absorption properties. Compared with conventional glass forming materials, silver halides demonstrate relatively low absorption properties for radiation in the infrared portion of the spectrum, particularly in the area of 10 to 12 microns. It is desirable to form glasses using silver halides to facilitate the fabrication of components for use in infrared systems, such as infrared laser system, and also for the purpose of forming glass fibers, which may be used for transmission of infrared laser radiation.

It is therefore an object of the present invention to provide a glass material, the principal components of which are silver halides.

SUMMARY OF THE INVENTION

In accordance with the present invention, there is provided a composition of matter which comprises a multi-component glass having two silver halide components in a selected ratio. In the preferred embodiment, the novel glass material comprises the following three components: two silver halide components, for example, 35 to 64 percent silver fluoride, 30 to 60 percent silver iodide, and up to 30 percent aluminum fluoride. Also included within the scope of the present invention, is a method of making the above-described multi-component silver halide glass. In accordance with this aspect of the invention, suitable silver halide components are mixed and melted in a crucible at about 300° C. to about 450° C. for one to two hours. During the melting phase of the process the components are stirred until a homogeneous mixture is obtained. Thereafter, the mixture is quenched. The quenching step may be achieved by pouring the molten mixture onto a metallic plate cooled with liquid nitrogen.

For a better understanding of the present invention, together with other and further objects, reference is made to the following description, taken in conjunction with the accompanying drawings, and its scope will be pointed out in the appended claims.

DESCRIPTION OF THE INVENTION

Figure 1:
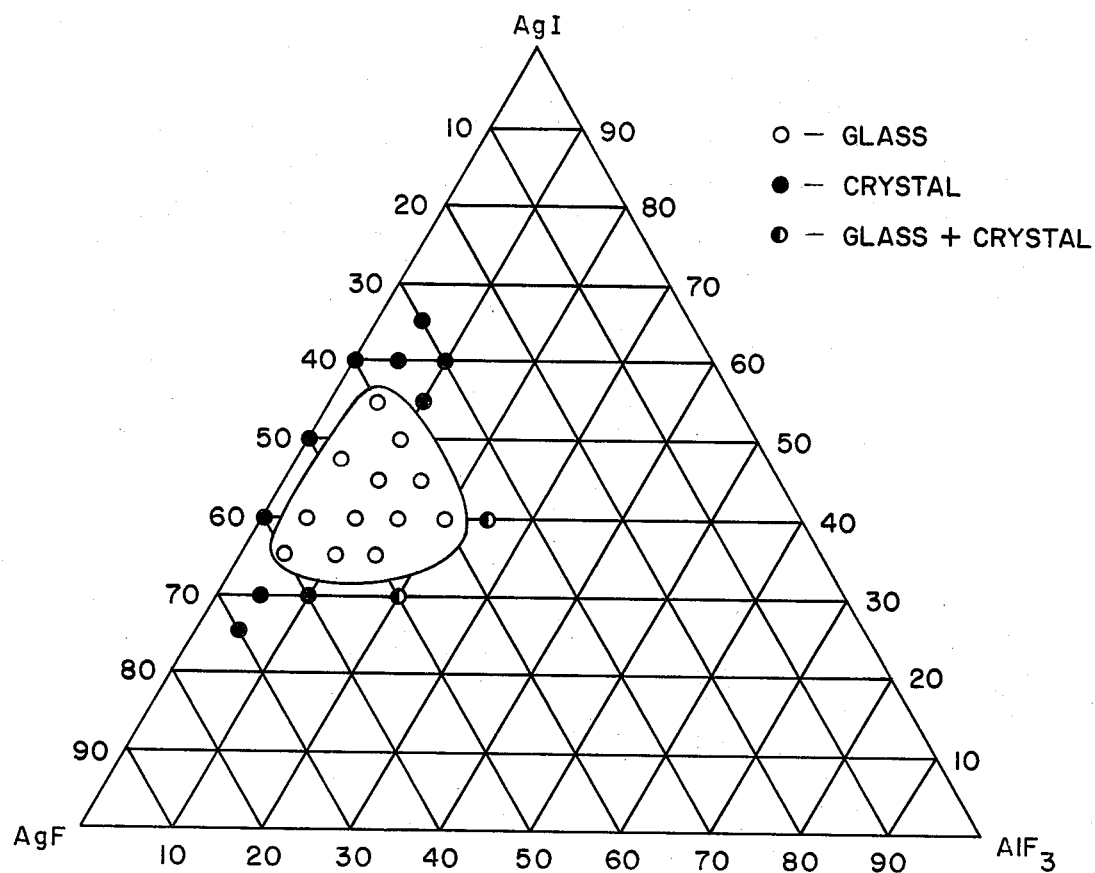
FIG. 1 is a phase diagram showing glass forming compositions according to the present invention.

FIG. 1 is a phase diagram illustrating the formation of glass in a three component system wherein the components are silver iodide, silver fluoride and aluminum fluoride. The points on the phase diagram are indicative of test samples which were prepared. As indicated on the phase diagram, the hollow circles indicate the formation of glass from a mixture, the solid circles indicate the formation of a crystalline solid, and the half-solid circles indicate the formation of both glass and crystalline solids. As indicated in the phase diagram, the formation of glass occurs in the phase region between 30 to 60 mole percent silver iodide, 35 and 64 mole percent silver fluoride and up to 30 mole percent aluminum fluoride. Positive glass formation was achieved in the range of 5 to 20 percent aluminum fluoride, 40 to 60 percent silver fluoride and 35 to 55 percent silver iodide.

The samples represented by the phase diagram were prepared by mixing and melting the three components in a porceline crucible at a temperature range of about 300° C. to about 450° C. for one to two hours in air atmosphere. The melt was stirred a few times using a glass rod. The melt was then poured onto a copper plate cooled with liquid nitrogen and pressed quickly to a thickness of about 1 mm and stored in a desiccator.

Subsequently, small amounts of the sample materials were ground to fine powder in liquid nitrogen for X-ray defraction analysis with a GE diffractometer using copper, $k_\alpha$ radiation with a nickel filter. X-ray analysis was carried out for all samples in order to identify crystalline phases. Infrared absorption measurements of some samples were made to check optical properties in the range of 2.5 to 16.5 microns.

The X-ray defraction showed several broad crystalline peaks in the analysis conducted on samples which produced a crystalline substance. Samples which contained aluminum fluoride and produced a glass showed no peak and a very large halo at low angles, which is typical for glasses. These results are summarized in Table I.

TABLE I

Chemical compositions studied in the AgI-AgF-AlF$_3$ System, and glass formation

| Sample Number | Composition (mole %) AgI | AgF | AlF$_3$ | Phase by X-ray diffraction analysis |
|---|---|---|---|---|
| 1 | 60 | 40 | — | Crystal |
| 2 | 50 | 50 | — | Crystal |
| 3 | 40 | 60 | — | Crystal |
| 4 | 65 | 30 | 5 | Crystal |
| 5 | 60 | 35 | 5 | Crystal |
| 6 | 60 | 30 | 10 | Crystal |
| 7 | 55 | 40 | 5 | Glass |
| 8 | 55 | 35 | 10 | Crystal |
| 9 | 50 | 40 | 10 | Glass |
| 10 | 47.5 | 47.5 | 5 | Glass |
| 11 | 45 | 45 | 10 | Glass |
| 12 | 40 | 55 | 5 | Glass |
| 13 | 40 | 50 | 10 | Glass |
| 14 | 35 | 60 | 5 | Glass |
| 15 | 30 | 65 | 5 | Crystal |
| 16 | 30 | 60 | 10 | Crystal |
| 17 | 25 | 70 | 5 | Crystal |
| 18 | 35 | 55 | 10 | Glass |
| 19 | 35 | 50 | 15 | Glass |
| 20 | 40 | 45 | 15 | Glass |
| 21 | 45 | 40 | 15 | Glass |
| 22 | 40 | 40 | 20 | Glass |
| 23 | 30 | 50 | 20 | Glass + Crystal |
| 24 | 40 | 35 | 25 | Glass + Crystal |

Figure 2:
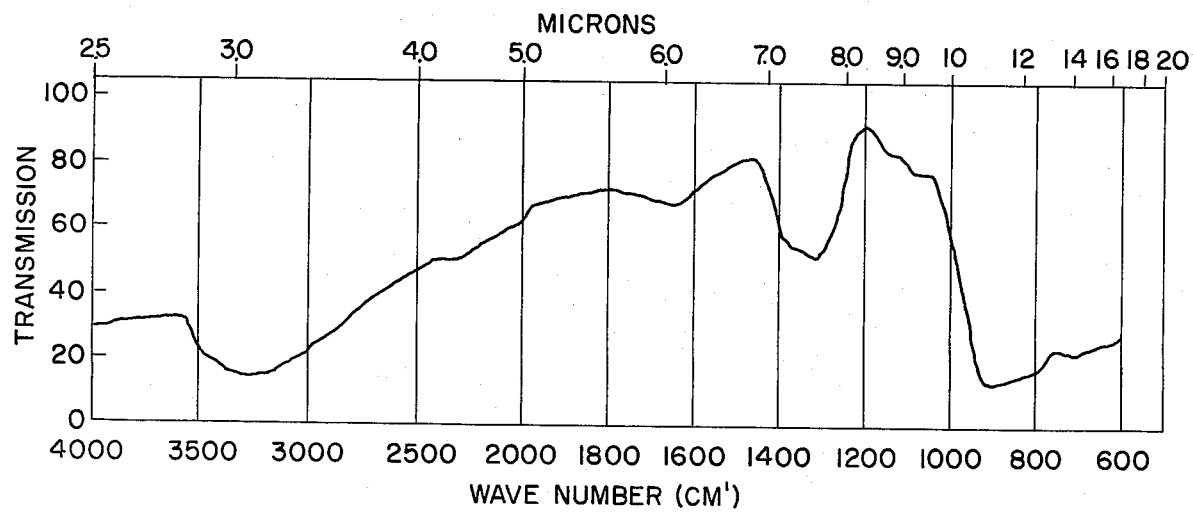
FIG. 2 is an infrared transmission spectrum for a glass according to the present invention.

FIG. 2 is a graph showing infrared absorption characteristics for a thin film sample of the silver halide glass formed according to the present invention. It can be seen that the glass has a few broad absorption peaks at approximately 3 microns and 6.2 microns, which are believed to result from the presence of OH molecular ions. An additional absorption area at 7.5 microns results from either silver fluoride or impurities, such as oxides. Aluminum fluoride shows no absorption in this region of wavelengths. The absorption edge at about 10 microns may be intrinsic to the glass, but might also be influenced by the presence of impurities. The silver halide glasses according to the present invention show a wide range of infrared transparencies which probably could be enhanced by careful purification of starting materials and preparation in an inert atmosphere. The transparency at 10 microns is unique for bulk glasses, and therefore the material of the present invention can be effectively used for optical components for $CO_2$ lasers.

A differential thermal analysis trace for glasses was also performed on the glassy samples of material of the present invention. The data from these analyses demonstrated that a crystallization peak at about 95° C. is further evidence that the starting material was glassy. Samples judged to be glassy from X-ray diffraction all show such crystalization peaks. Crystalization samples did not show these peaks. Glass transition and melting temperatures derived from the differential thermal analysis trace are given in Table II. The addition of aluminum fluoride to the silver fluoride-silver iodide mixtures seems to increase both the melting and the glass transition temperatures.

TABLE II

| Sample | GLASS Glass Transition Temperature $T_g$ (°C.) | Melting Temperature $T_m$ (°C.) |
|---|---|---|
| 7 | 45 | 160 |
| 10 | 50 | 180 |
| 11 | 55 | 200 |
| 12 | 55 | 175 |
| 13 | 60 | 195 |
| 9 | 50 | 190 |
| 22 | 60 | |
| 21 | 55 | |
| 2* | — | 75 |
| 15* | — | 80 |
| 4* | — | 135 |

*Crystalline samples.

The results obtained from the silver fluoride, silver iodide aluminum fluoride glasses seem to indicate that it would be possible to form glasses from other alternative mixtures, such as silver fluoride, aluminum fluoride and a silver halide other than iodide or fluoride.

While there have been described what are believed to be the preferred embodiments of the invention, those skilled in the art will recognize that other and further modifications may be made thereto without departing from the spirit of the invention and is intended to claim all such embodiments as fall within the true scope of the invention.

We claim:

1. A glass composition comprising 35 to 64 percent silver fluoride, 30 to 60 percent silver iodide and aluminum fluoride wherein said aluminum fluoride is present in an amount up to 30 percent of said glass.

2. A glass composition comprising 40 to 60 percent silver fluoride, 35 to 55 percent silver iodide and 5 to 20 percent aluminum fluoride.

3. A method of making the glass of claim 1 comprising mixing and melting said components in a crucible at 300° to 450° C. for one to two hours, stirring said components until a homogeneous mixture is obtained and quenching said mixture.

4. The method according to claim 3 wherein said mixture is quenched by pouring onto a metallic plate cooled with liquid nitrogen.

* * * * *